Dec. 1, 1931.  C. W. KUHN  1,834,127
MOTOR CONTROLLER
Filed Oct. 27, 1930
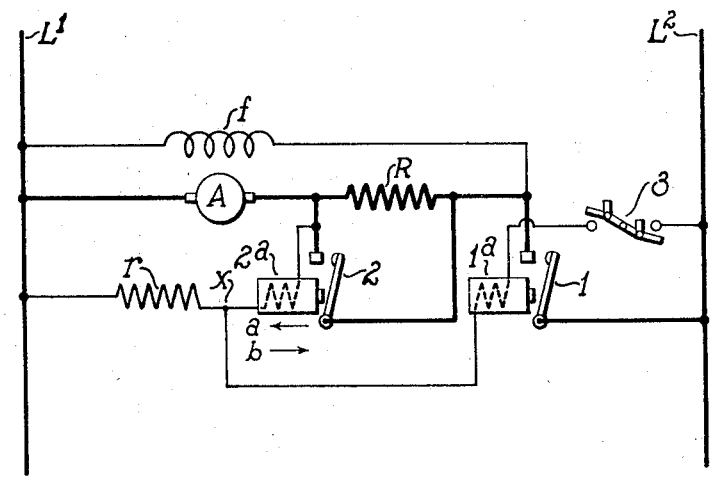
Inventor
Clarence W. Kuhn
By Frank H. Hubbard.
Attorney Patented Dec. 1, 1931

1,834,127

UNITED STATES PATENT OFFICE

CLARENCE WILBUR KUHN, OF MILWAUKEE, WISCONSIN, ASSIGNOR TO CUTLER-HAMMER, INC., OF MILWAUKEE, WISCONSIN, A CORPORATION OF DELAWARE

MOTOR CONTROLLER

Application filed October 27, 1930. Serial No. 491,608.

This invention relates to motor controllers and is particularly applicable to push button controlled starters for direct current motors.

Starters for direct current motors are commonly provided with an electromagnetically operated main switch for controlling the line connections for the motor and an electromagnetically operated accelerating switch which is subjected to control by the counter E. M. F. of the motor. In such starters the main switch is usually provided with auxiliary contacts for controlling the energizing circuit of the accelerating switch to insure against restarting of the motor with the accelerating switch in closed position.

The present invention has among its objects to provide an improved motor starter of the counter E. M. F. type which provides for control of the accelerating switch in the required manner without the use of auxiliary contacts.

Another object is to provide a motor starter of the aforesaid type which is adapted upon restarting of the motor to insure opening of the accelerating switch upon given counter E. M. F. conditions in the motor circuit.

Various other objects and advantages of the invention will hereinafter appear.

The accompanying drawing diagrammatically illustrates an embodiment of the invention which will now be described, it being understood that the embodiment illustrated may be modified in certain respects without departing from the spirit and scope of the appended claims.

Referring to the drawing, the same illustrates a direct current motor M to be supplied with current from a supply circuit indicated by lines $L^1$—$L^2$, said motor being provided with an armature A and a shunt field winding $f$. The control means for motor M includes an electromagnetic main switch 1 and an electromagnetic accelerating switch 2 which controls a starting resistance R in the armature circuit of the motor.

Main switch 1 is controlled by a switch 3 which is preferably of a snap type having separate push buttons for opening and closing the same. An impedance comprising a resistance $r$ is connected to line $L^1$, and the operating winding $2^a$ of accelerating switch 2 is connected through said resistance across the terminals of armature A while the operating winding $1^a$ of main switch 1 is connected to a point $x$ between resistance $r$ and winding $2^a$ and is adapted to be connected to line $L^2$ by switch 3.

The function and operation of the aforedescribed controller will now be more fully described. Upon closure of switch 3 the operating winding $1^a$ of main switch 1 is connected across lines $L^1$—$L^2$ through parallel circuites, one including resistance $r$ and the other including the motor armature A and the operating winding $2^a$ of accelerating switch 2. Assuming that the motor is at rest the voltage drop across armature A is negligible and current is then adapted to pass from line $L^1$ to the operating winding $1^a$ of line switch 1 in parallel through resistance $r$ and the operating winding $2^a$ in the direction of arrow $a$. The current thus supplied to winding $1^a$ effects closure of main switch 1 while the current traversing winding $2^a$ in the direction of arrow $a$ is insufficient to effect response of accelerating switch 2. As is apparent, upon closure of main switch 1 the armature A and shunt field $f$ of the motor are connected across lines $L^1$—$L^2$ and the resistance R is included in the armature circuit of the motor.

The motor then accelerates and due to the counter E. M. F. of the motor the potential at the right hand terminal of the motor armature gradually approaches that of line $L^2$. The current in the operating winding $2^a$ of accelerating switch 2 thus reverses, the same being then in the direction of arrow $b$ and increases as the speed of the motor increases. While reversal of the current in the winding $2^a$ reduces the current supplied to the operating winding $1^a$ of the main switch the current through resistance $r$ is of sufficient value to maintain said main switch in closed position. Upon acceleration of the motor to a given speed the operating winding $2^a$ effects closure of accelerating switch 2, and as is apparent resistance R is then excluded from the armature circuit of the motor.

Assuming that the motor is operating and switch 3 is opened and reclosed prior to stopping of the motor. Opening of switch 3 causes the main switch 1 to drop out, but if the motor is operating at a relatively high speed accelerating switch 2 remains in closed position, since the operating winding thereof is supplied with current in the direction of arrow $b$ due to the counter E. M. F. of the motor. However, as the speed of the motor decreases the counter E. M. F. thereof decreases, and upon a given reduction in the speed of the motor current is supplied to the operating winding $1^a$ through the operating winding $2^a$ in the direction of arrow $a$. The current in operating winding $2^a$ is thus reversed and accelerating switch 2 drops out to include resistance R in the armature circuit of the motor.

As is apparent, by proper design of resistance $r$ and operating windings $1^a$ and $2^a$ main switch 1 can be made to close immediately upon closure of switch 3 regardless of the speed at which the motor is operating. However, if the motor is operating at a relatively low speed at the time of closure of switch 3 the direction of current in winding $2^a$ will be reversed, as hereinbefore set forth, to insure opening of accelerating switch 2 prior to reclosure of main switch 1. Also it is apparent that by designing resistance $r$ and operating windings $1^a$ and $2^a$ so that main switch 1 can close only when its operating winding is supplied with current through the operating winding $2^a$ in the direction of arrow $a$ it is possible to prevent reclosure of said main switch until the motor is brought substantially to rest.

What I claim as new and desire to secure by Letters Patent is:

1. The combination with a direct current motor and a supply circuit therefor, of electroresponsive main and eccelerating switches for said motor, said switches having operating windings to be connected across said supply circuit in series with each other and with the armature of said motor, and an impedance connected in parallel with the armature of said motor and the operating winding of said accelerating switch.

2. The combination with a direct current motor and a supply circuit therefor, of an electroresponsive switch for connecting said motor to said supply circuit, circuit connections between one terminal of the operating winding of said switch and opposite sides of the armature of said motor, each of said connections including an impedance, and means for connecting the operating winding of said switch across said supply circuit through one of said impedances, said winding when so connected being supplied with current through the armature of said motor, and the other of said impedances, but only when said motor is substantially at rest.

3. The combination with a direct current motor and a supply circuit therefor, of an impedance, an accelerating switch having an operating winding connected across the armature of said motor through said impedance and adapted to respond upon given counter E. M. F. conditions in the circuit of said motor, and a main switch for connecting said motor to said supply circuit, said main switch having an operating winding connected between said impedance and the operating winding of said accelerating switch, and a manually controlled switch for connecting the operating winding of said main switch to said supply circuit through said impedance and also through the armature of said motor and the operating winding of said accelerating switch.

4. The combination with a direct current motor and a supply circuit therefor, of an impedance, a main switch having an operating winding to be supplied with current from said supply circuit through said impedance and an accelerating switch responsive upon a given counter E. M. F. of said motor, said accelerating switch having an operating winding connected across the motor armature through said impedance, the operating winding of said main switch being adapted to be supplied with current from said supply circuit through the armature of said motor and the operating winding of said accelerating switch, but only upon given counter E. M. F. conditions in the motor circuit.

5. The combination with a direct current motor and a supply circuit therefor, of electroresponsive main and accelerating switches for said motor, said switches having operating windings adapted to be connected across said supply circuit in series with each other and with the armature of said motor, and a shunt connection across the armature of said motor and the operating winding of said accelerating switch including an impedance, said connection subjecting the operating winding of said accelerating switch to control by the counter E. M. F. of said motor to provide for closure of said accelerating switch upon a given speed of said motor and insuring opening of said accelerating switch by reversal of the current in the operating winding thereof upon closure of said main switch with said motor operating at relatively low speeds.

In witness whereof, I have hereunto subscribed my name.

CLARENCE WILBUR KUHN.